(12) United States Patent
Kim

(10) Patent No.: US 9,729,793 B2
(45) Date of Patent: Aug. 8, 2017

(54) CAMERA MODULE

(71) Applicant: LG Innotek Co., Ltd., Seoul (KR)

(72) Inventor: Eun Mi Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/007,877

(22) Filed: Jan. 27, 2016

(65) Prior Publication Data

US 2016/0142636 A1    May 19, 2016

Related U.S. Application Data

(63) Continuation of application No. 14/355,310, filed as application No. PCT/KR2012/008253 on Oct. 11, 2012, now Pat. No. 9,264,618.

(30) Foreign Application Priority Data

Oct. 31, 2011 (KR) .................. 10-2011-0112313

(51) Int. Cl.
   *G02B 13/16* (2006.01)
   *H04N 5/225* (2006.01)
   (Continued)

(52) U.S. Cl.
   CPC ....... *H04N 5/23287* (2013.01); *H04N 5/2253* (2013.01); *H04N 5/2254* (2013.01);
   (Continued)

(58) Field of Classification Search
   CPC ............. H04N 5/23287; H04N 5/2254; H04N 5/2253; H04N 5/23248; H04N 5/23212;
   (Continued)

(56) References Cited

U.S. PATENT DOCUMENTS 5,881,033 A * 3/1999 Murakami ........... G11B 7/0933
                                                          359/814
6,101,339 A * 8/2000 Miki .................. G03B 7/26
                                                          348/372
(Continued)

FOREIGN PATENT DOCUMENTS

CN        102209933 A    10/2011
JP      2009288769 A    12/2009
(Continued)

OTHER PUBLICATIONS

European Search Report dated May 11, 2015 in European Application No. 12846668.7.
(Continued)

*Primary Examiner* — Yogesh Aggarwal
(74) *Attorney, Agent, or Firm* — Saliwanchik, Lloyd & Eisenschenk

(57) ABSTRACT

The present invention relates to a camera module including an auto focusing module vertically moving a lens, a handshake compensation module wrapping the auto focusing module, and tilting the auto focusing module to compensate handshake, a circuit board electrically connected to the handshake compensation module, a bottom case supporting the circuit board and coupled to the auto focusing module, a main circuit board fixed to bottom case and electrically connected to an image sensor module and the circuit board, and a spring unit arranged at a periphery of the main circuit board and having a symmetrical opening having thereinside a gap spaced apart at a predetermined distance.

12 Claims, 3 Drawing Sheets

(51) Int. Cl.
*H04N 5/232* (2006.01)
*G03B 17/04* (2006.01)
*G03B 3/10* (2006.01)
*G03B 5/00* (2006.01)

(52) U.S. Cl.
CPC ....... *H04N 5/2257* (2013.01); *H04N 5/23212* (2013.01); *H04N 5/23248* (2013.01); *G03B 3/10* (2013.01); *G03B 5/00* (2013.01); *G03B 17/04* (2013.01)

(58) Field of Classification Search
CPC .......... H04N 5/2257; G03B 3/10; G03B 5/00; G03B 17/04
USPC ..... 348/335, 340, 342, 370–375; 250/208.1; 257/290–292
See application file for complete search history.

(56) References Cited

U.S. PATENT DOCUMENTS

| | | | |
|---|---|---|---|
| 7,535,509 B2* | 5/2009 | Takayama | G02B 3/0075 257/294 |
| 9,001,224 B2 | 4/2015 | Moriya et al. | |
| 2009/0109318 A1* | 4/2009 | Chang | G03B 3/00 348/340 |
| 2009/0303594 A1 | 12/2009 | Lim et al. | |
| 2010/0001956 A1* | 1/2010 | Choi | G06F 3/0317 345/166 |
| 2011/0211821 A1 | 9/2011 | Park et al. | |
| 2011/0262121 A1 | 10/2011 | Yanagisawa et al. | |
| 2012/0154614 A1* | 6/2012 | Moriya | G03B 3/10 348/208.5 |

FOREIGN PATENT DOCUMENTS

| | | |
|---|---|---|
| JP | 2010096859 A | 4/2010 |
| TW | M317027 U | 8/2007 |
| WO | WO-2011037027 A1 | 3/2011 |

OTHER PUBLICATIONS

Office Action dated Apr. 24, 2015 in U.S. Appl. No. 14/355,310.
Office Action dated Mar. 20, 2017 in Taiwanese Application No. 105123605.

* cited by examiner

CAMERA MODULE

CROSS-REFERENCE TO RELATED APPLICATIONS

This application is a continuation of U.S. application Ser. No. 14/355,310, filed Apr. 30, 2014, which is the U.S. National Stage Application of International Patent Application No. PCT/KR2012/008253, filed Oct. 11, 2012, which claims priority to Korean Application No. 10-2011-0112313, filed Oct. 31, 2011 the disclosures of each of which are incorporated herein by reference in their entirety.

TECHNICAL FIELD

The teachings in accordance with exemplary embodiments of this invention relate generally to a camera module applicable to smart phones and the like.

BACKGROUND ART

Small camera modules mounted on small electronic product often suffer from frequent shocks during use. This is caused by subtle vibration from a user handshake or trembling during photographing process. In consideration of the disadvantage, camera modules having anti-handshake means have been recently disclosed.

One known art in the related field, Korean Registered Patent No. 10-0741823 (registered on Jul. 16, 2007) teaches an hand-shake (hand vibration) compensation mechanism, where a gyro sensor IC (Integrated Circuit) or an angular velocity sensor is installed inside a device such as a mobile phone mounted with a camera module.

However, installation of a separate angular velocity sensor needs a separate detection sensor for realizing the handshake compensation function, resulting in an increased manufacturing cost and cumbersomeness of providing a space for configuring and installing a handshake prevention device aside from the camera module. Thus, technical development to improve anti-handshake or handshake compensation function is required.

DISCLOSURE

Technical Problem

Accordingly, embodiments of the present invention may relate to a camera module that substantially obviates one or more of the above disadvantages/problems due to limitations and disadvantages of related art, and it is an object of the present invention to provide a camera module configured to include auto focusing and handshake compensation functions, to greatly enhance assembly, and to prevent deteriorated handshake compensation function caused by a main printed circuit board applied with a driving signal.

Technical problems to be solved by the present invention are not restricted to the above-mentioned statement, and any other technical problems not mentioned so far will be clearly appreciated from the following description by skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

Technical Solution

In order to accomplish the above object, in one general aspect of the present disclosure, there is provided a camera module, the camera module comprising: an auto focusing module vertically moving a lens; a handshake compensation module wrapping the auto focusing module, and tilting the auto focusing module to compensate handshake; a circuit board electrically connected to the handshake compensation module; a bottom case supporting the circuit board and coupled to the auto focusing module; a main circuit board fixed to bottom case and electrically connected to an image sensor module and the circuit board; and a spring unit arranged at a periphery of the main circuit board and having a symmetrical opening having thereinside a gap spaced apart at a predetermined distance.

Preferably, but not necessarily, the spring unit may include a first spring unit arranged at an outmost periphery and having a first thickness, a second spring unit arranged at a body of the main circuit board and having a second thickness; and a pair of openings formed at a space interposed between the first and second spring units.

Preferably, but not necessarily, the second thickness may have a value smaller than that of the first thickness, and the first spring unit and the second spring unit are formed in one body.

Preferably, but not necessarily, each opening may be formed along at least three surfaces of the main circuit board in a slit shape.

Preferably, but not necessarily, a floor surface opposite to the bottom case of the first spring unit may be formed with a hook unit coupled to each bottom case.

Preferably, but not necessarily, the camera module may further comprise a holder securing the image sensor module.

Preferably, but not necessarily, the auto focusing module may include an auto focusing housing mounted with a magnet at a periphery, a bobbin arranged inside the auto focusing housing and mounted with a lens, a coil wound on a periphery of the bobbin, and an auto focusing magnet opposite to the coil and secured to the auto focusing housing.

Preferably, but not necessarily, the handshake compensation module may include a housing wrapping the auto focusing module, a coil block arranged at a lateral wall of the housing, and a magnet opposite to the coil block and arranged at an external surface of the auto focusing module.

Preferably, but not necessarily, the camera module may further comprise a leaf spring including an external elastic unit coupled to a bottom surface of the housing, an inner elastic unit coupled to the auto focusing module, and a connection elastic unit connecting the external elastic unit and the inner elastic unit.

Preferably, but not necessarily, the external elastic unit may be electrically connected to the circuit board, and the inner elastic unit may be electrically connected to the auto focusing module.

Preferably, but not necessarily, the circuit board may include a first terminal electrically connected to each coil block, and a second terminal electrically connected to the auto focusing module.

Preferably, but not necessarily, the main circuit board may be a rigid FPCB (Flexible Printed Circuit Board).

Advantageous Effects

A camera module according to the present invention has an advantageous effect in that an auto focusing module is used to vertically move a lens, an auto focusing module is tilted to perform handshake compensation, and an opening symmetrical to a main circuit board coupled to the auto focusing module is formed to prevent the auto focusing module from performing an erroneous tilting operation.

Another advantageous effect is that a part of a FPCB performing a function of an elastic member is arranged at a main circuit board to minimize a gap formed between the FPCB and the main circuit board, whereby the camera module can be miniaturized.

DESCRIPTION OF DRAWINGS

The teachings of the present invention can be readily understood by considering the following detailed description in conjunction with the accompanying drawings, in which.

BEST MODE FOR INVENTION

Figure 1:
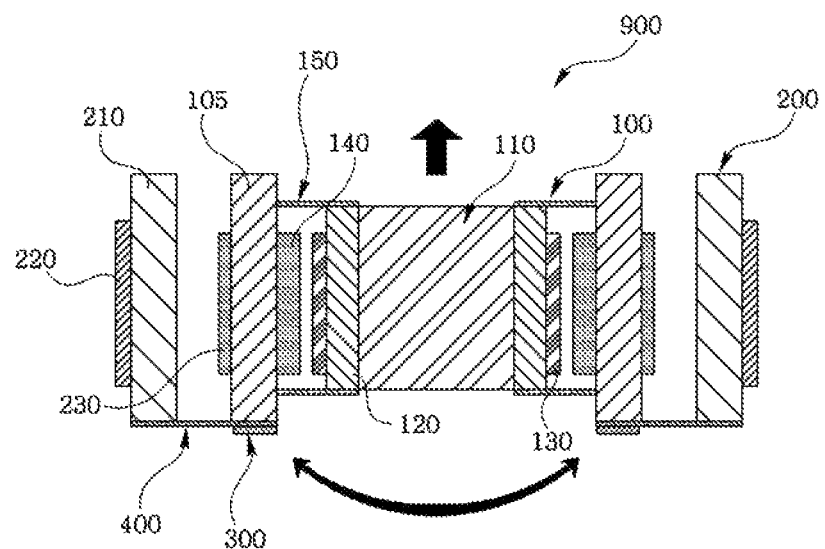
FIG. 1 is a cross-sectional view illustrating an auto focusing module and a handshake compensation module according to an exemplary embodiment of the present invention.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

Figure 2:
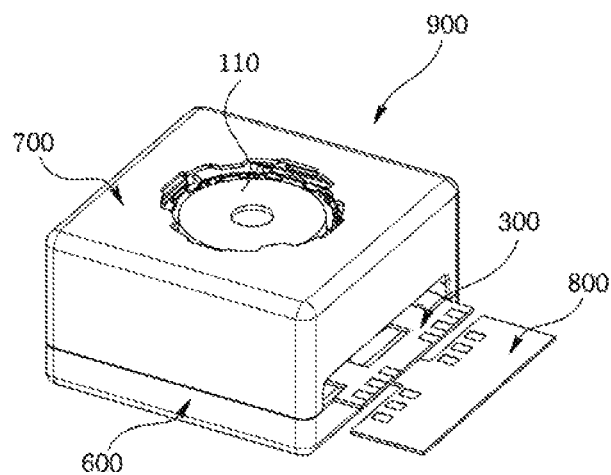
FIG. 2 is an assembled perspective view of FIG. 1.
Figure 3:
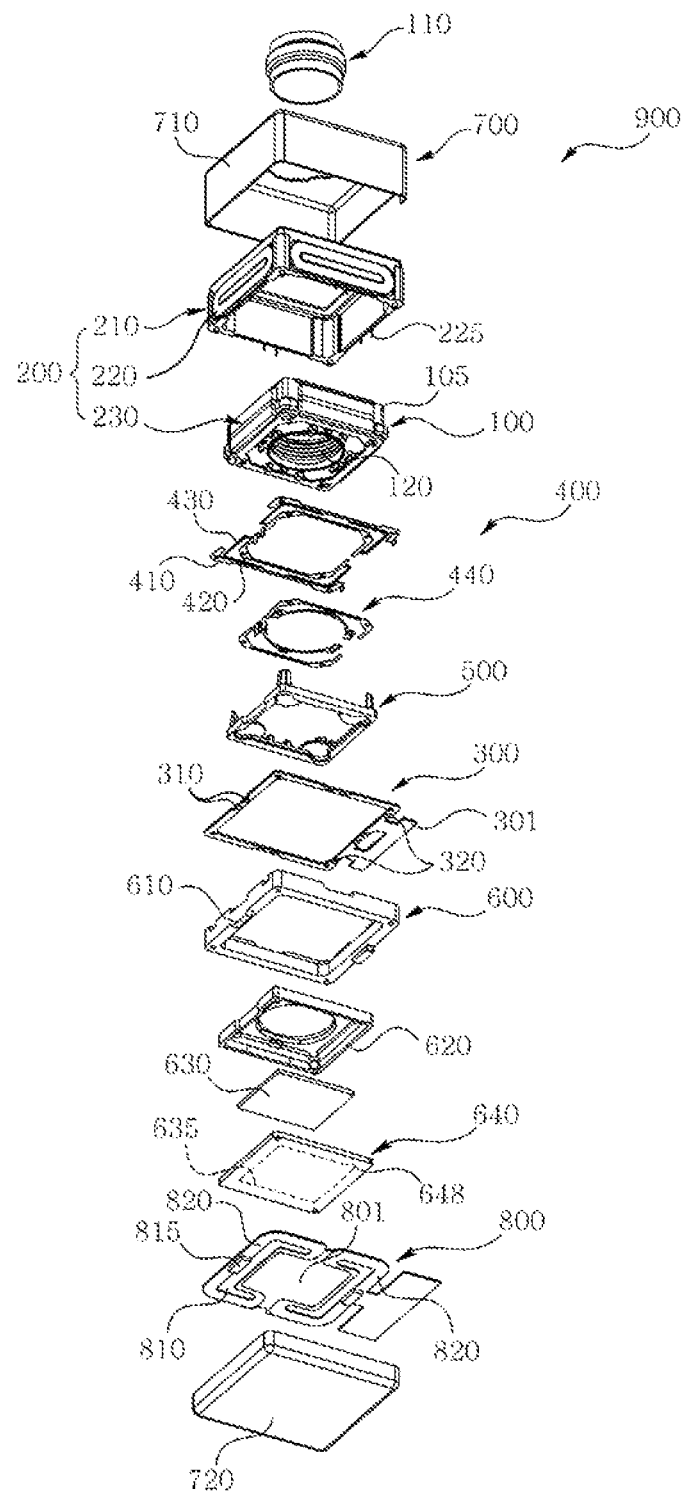
FIG. 3 is an exploded perspective view illustrating a camera module according to an exemplary embodiment of the present invention.
Figure 4:
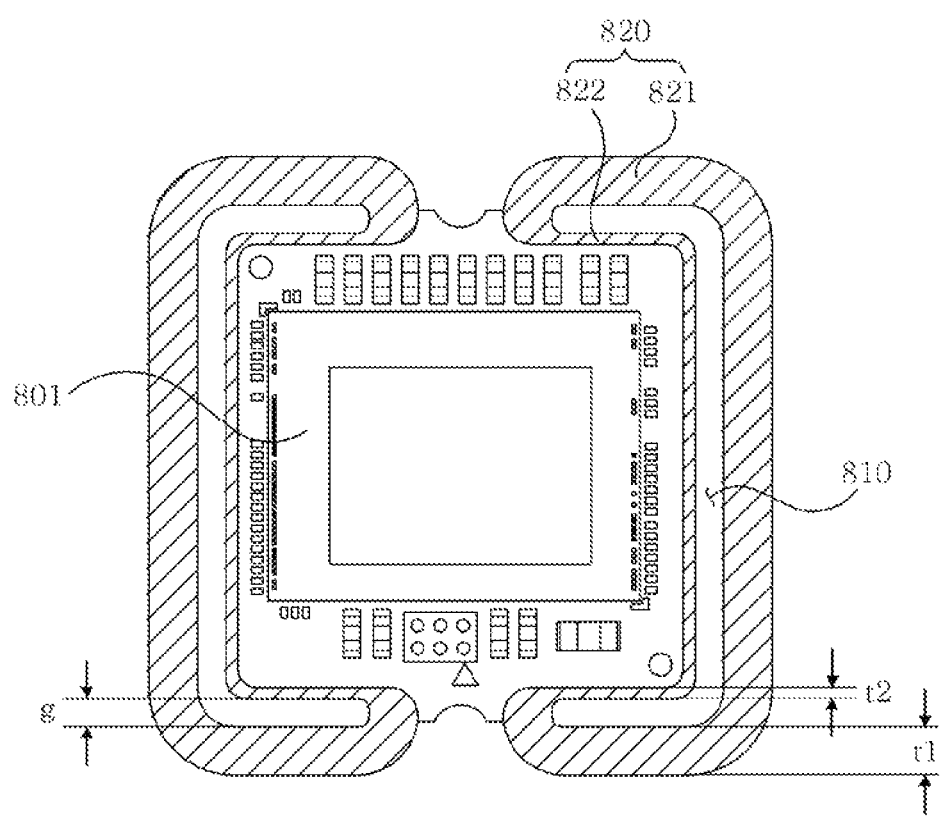
FIG. 4 is a plan view of a main circuit board of FIG. 3.

FIG. 1 is a cross-sectional view illustrating an auto focusing module and a handshake compensation module according to an exemplary embodiment of the present invention, FIG. 2 is an assembled perspective view of FIG. 1, FIG. 3 is an exploded perspective view illustrating a camera module according to an exemplary embodiment of the present invention, and FIG. 4 is a plan view of a main circuit board of FIG. 3.

Referring to FIGS. 1 to 4, a camera module (900) may include an auto focusing module (100), a handshake compensation module (200), a circuit board (300), an elastic member (400), a base (500), a bottom case (600), a cover can (700) and a main circuit board (800).

Referring to FIG. 1, the auto focusing module (100) may include an auto focusing housing (105), a lens (110), a bobbin (120), an auto focusing coil (130), an auto focusing magnet (140) and auto focusing elastic member (150). The auto focusing housing (105) may be formed in a box shape opened at an upper surface and a bottom surface, for example.

The bobbin (120) is arranged inside the auto focusing housing (105). The bobbin (120) may take a shape of a cylinder, for example, and may be mounted at an inner circumference with a lens (110). The auto focusing coil (130) may be wound on a periphery of the bobbin (120). The auto focusing coil (130) may be formed by winding a long insulating resin-coated wire wound on a periphery of the bobbin (120). The auto focusing coil (130) generates a magnetic field when applied with a current, where direction of the magnetic field is determined by direction of current.

The auto focusing magnet (140) is mounted inside the auto focusing housing (105), and arranged opposite to the auto focusing coil (130). The auto focusing elastic member (150) serves to elastically secure the bobbin (120) to the auto focusing housing (105), and is formed in a two mutually-insulated shape.

The auto focusing module (100) functions to adjust a focus of an image passing through the lens (110) installed inside the bobbin (120) using the movement of the bobbin (120) vertically reciprocating in response to attractive force and repulsive force generated by interaction between the magnetic field generated by application of a current to the auto focusing coil (130) and the magnetic field generated by the auto focusing magnet (140).

Referring to FIG. 3, the handshake compensation module (200) can obtain a high quality of image by being coupled to the auto focusing module (100) to compensate the handshake of the auto focusing module (100). The handshake compensation module (200) includes a housing (210), a coil block (220) and a magnet (230).

The housing (210) is configured by including four lateral walls, and is arranged at a periphery of the auto focusing housing (105) of the auto focusing module (100) to wrap the auto focusing module (100). The coil block (220) is arranged inside a reception groove formed at a periphery of each lateral wall of the housing (210). Each of the coil blocks (220) is formed by winding a long insulating resin-coated wire in the shape of a rectangle. Thus, each of the coil blocks (220) has two distal ends.

In an exemplary embodiment of the present invention, it is possible to easily assemble the coil blocks (220) to a circuit board (300, described later) in a case the coil blocks (220) are arranged on a periphery of four lateral walls of the housing (210). Meanwhile, assembly of the coil blocks (220) and the circuit board becomes difficult to frequently generate defects in assembly process, in a case the coil blocks (220) are arranged on an inner circumference of each lateral wall of the housing (210) of very small size.

The magnet (230) is arranged at a periphery of the auto focusing module (100), and a magnetic field generated by the magnet (230) reacts with the magnetic field generated by the coil blocks (220) formed at the periphery of the lateral walls of the housing (210) to prevent or restrict the handshake of the auto focusing.

In an exemplary embodiment of the present invention, a driving signal corresponding to a signal corresponding to a sensing signal inputted from a gyro sensor, for example, is inputted to the coil blocks (220) of the handshake compensation module (200).

Referring to FIG. 1, the circuit board (300) takes a shape of a square frame when viewed from a top view, in order to improve assembly of the coil blocks (220) and the circuit board (300) and to reduce defects in assembly process, and the circuit board (300) is formed along a bottom surface of the housing (210) of the handshake compensation module (200), for example, whereby the circuit board (300) covers the bottom surface of the housing (210).

In an exemplary embodiment of the present invention, the circuit board (300) may be a FPCB (Flexible Printed Circuit Board) formed with circuit wirings and terminals, for example. Part of the circuit board (300) may be protruded outside of the housing (210) of the handshake compensation module (200) in order to be electrically connected to the main circuit board (800). The circuit board (300) is formed with first terminals (310), second terminals (320) and connection wirings (not shown).

The first terminals (310) are arranged at positions corresponding to those of both distal ends of each of the coil blocks (220), and the second terminals (320) are formed at positions connected to terminals (401) of leaf spring (400) each connected to both distal ends of the auto focusing coil (140) of the auto focusing module (100).

In an exemplary embodiment of the present invention, in a case the coil block (220) is formed with 4 blocks, 8 first terminals (310) are formed on the circuit board (300), and 2 second terminals (320) are formed on the circuit board (300).

Furthermore, a portion (301) where the part of the circuit board (300) that is protruded outside of the housing (210) of the handshake compensation module (200) is formed with 4 pieces of connection terminals connected to the first terminals (310) and 2 pieces of connection terminals connected to the second terminals (320). Foreign substances generated in the course of soldering process can be prevented to thereby enhance the product performance, because the portion (301) protruded outside of the housing (210) is arranged outside of the housing (210).

Both distal ends (225) of each coil block (220) of the handshake compensation module (200) are connected to the first terminal (310), where in order to enhance assembly characteristics and to prevent defects in assembly, each distal end of terminal at the coil block (220) is arranged on the first terminal (310), and each distal end (225) of the coil block (220) and the first terminal (310) are electrically connected by soldering and the like.

The elastic member (400) serves to elastically support the tilting auto focusing module (100) and to electrically connect the auto focusing coil (140) of the auto focusing module (100) illustrated in FIG. 1 and the circuit board (300).

In an exemplary embodiment of the present invention, the elastic member (400) is formed in a pair of mutually electrically insulated state. Each elastic member (400) in the pair is interposed between a bottom surface of the housing (210) of the handshake compensation module (200) and circuit board (300). Each elastic member (400) includes an external elastic unit (410), an inner elastic unit (420) and a connection elastic unit (430).

The external elastic unit (410) is formed along a bottom surface of the housing (210) of the handshake compensation module (200). The external elastic unit (410) is insertedly coupled to a lug formed at the bottom surface of the housing (210). The external elastic unit (410) is formed with a terminal unit coupled to the second terminal (320) of the circuit board (300).

In an exemplary embodiment of the present invention, the terminal unit formed at the external elastic unit (410) is electrically connected to the second terminal (320) of the circuit board (300) by way of soldering and the like. The second terminal (320) of the circuit board (300) and the terminal unit formed at the external elastic unit (410) are soldered to the outside to prevent connection defects and to enhance the assembly.

The inner elastic unit (420) is coupled to a bottom surface of the auto focusing housing (105) of the auto focusing module (100) to elastically support the auto focusing housing (105) when the auto focusing module (100) is compensated of handshake. The connection elastic unit (430) serves to connect the external elastic unit (410) and the inner elastic unit (420), where the auto focusing module (100) is elastically supported to the handshake compensation module (200) by the connection elastic unit (430).

The external elastic unit (410) of the elastic member (400) is electrically connected to the second terminal (320) of the circuit board (300), whereby a driving signal provided by the second terminal (320) sequentially passes the external elastic unit (410), the connection elastic unit (430) and the inner elastic unit (420) to be provided to the auto focusing coil (140) of the auto focusing module (100).

The elastic member (400) may further include a leaf spring (440) for auto focusing module (100), where the leaf spring (440) for auto focusing module (100) elastically supports a bottom surface of the bobbin (120) of the auto focusing module (100).

Two leaf springs (440) for auto focusing module (100) are electrically and mechanically connected to the elastic member (400), and both distal ends of the auto focusing coil (140) wound on the bobbin (140) are respectively and electrically connected to the leaf spring (440) for auto focusing module (100).

The base (500) takes the shape of frame having an opening, and coupled to a bottom surface of the auto focusing housing (105) of the auto focusing module (100). The inner elastic unit (420) of the elastic member (400) is secured to a bottom surface of the base (500) and the auto focusing housing (105) by the base (500).

The bottom case (600) takes the shape of a square frame formed with an opening to be coupled to the auto focusing module (100). A bottom surface of the bottom case (600) is formed with coupling units (610) for securing the main circuit board (800, described later). Each of a pair of coupling units (610) is oppositely formed at each side of the bottom case (600). The coupling units (610) functions to prevent generation of interference when the auto focusing module (100) is tilted.

Meanwhile, a holder (620) formed with an opening is arranged at a rear surface of the base (500) in order to generate a digital image using light that has passed the lens (110). An IR (Infrared) filter (630) is arranged at an inner side of the holder (620), and a rear surface of the IR filter (630) is arranged with an image sensor module (640) including image sensor circuit board (648) coupled to an image sensor (635) for generating a digital image.

MODE FOR INVENTION

Referring to FIG. 1, the main circuit board (400) takes the shape of a rectangular frame, and includes a body unit (801) formed by a rigid FPCB (Flexible Printed Circuit Board), and a spring unit (820) arranged about the body unit (810) to elastically support the main circuit board (800).

An upper surface of the body unit (801) is arranged with the image sensor module (640) and may be arranged with a plurality of terminals for electrically connecting the image sensor module (640). The terminals are electrically connected to the image sensor circuit board (648) of the image sensor module (640) and the circuit board (300) to apply a driving signal to the image sensor module (640), the auto focusing module (100) and the handshake compensation module (200).

The body unit (810) is circumferentially formed with the spring unit (820), and the spring unit (820) is formed at an inner surface with an approximately "U" shaped opening (810). The spring unit (820) is arranged about the body unit (801) of the main circuit board (800) to elastically support the main circuit board (900).

In an exemplary embodiment of the present invention, the spring unit (820) as a dummy may be provided as a FPCB that is not wired to the other terminals. Furthermore, the spring unit (820) may further include a connection unit electrically connected to the circuit board (320) and protruded to outside of the housing (210). The connection unit, being protruded outside of the camera module and not soldered inside the camera module, serves to prevent foreign substances generated in the course of soldering process from entering the camera module, thereby enhancing the product performance.

Referring to FIG. 4 again, the spring unit (820) may include a first spring unit (821) having a first thickness (t1) and a second spring unit (822) having a second thickness (t2), and an opening (810) having a predetermined gap (g) is interposed between the first and second spring units (821, 822). The opening (810) is formed inside the spring unit (820) in the shape of an oval or a slit, or may be formed in a "U" shape along three lateral surfaces of the main circuit board (800).

The first thickness (t1) is preferably greater than the second thickness (t2), where the second thickness (t2) may be 0.2 mm or less.

The first spring unit (821) is formed at a bottom surface with at least a pair of hook units (815), and according to an exemplary embodiment of the present invention, the pair of hook units (815) may be symmetrically formed about a center of the bottom case (600) as shown in FIG. 3. The pair of hook units (815) functions to prevent generation of interference when the auto focusing module (100) is tilted. The spring unit (820) serves to add an elastic restoring force to the main circuit board (800) when the main circuit board (800) is tilted along with the auto focusing module (100).

In an exemplary embodiment of the present invention, each of the two openings (810) formed on the spring unit (820) is symmetrically formed about a center of the main circuit board (800) to solve the tilting defect where the tilting is not accurately performed by the main circuit board (800) when the main circuit board (800) is tilted along with the auto focusing module (100).

Particularly, in a case the opening (810) is formed at a center of the spring unit (820), the gap (g) interposed between the first and second spring units (821, 822) can be minimized to resultantly reduce length and breadth of the camera module and to be advantageously conducive to miniaturization of the camera module. That is, the second spring unit (822) of flexible material is arranged about the body unit (801) to enable a normal operation, even if the gap (g) between the first and second spring units (821, 822) is reduced, whereby the camera module can be reduced in size as much as the reduced gap (g) to provide an advantageous minimal design structure.

Meanwhile, the cover can (700) includes an upper cover can (710) and a bottom cover can (720), where each of the upper and bottom cover cans (710, 720) has a reception space accommodating the abovementioned constituent elements.

As apparent from the foregoing, the camera module according to the exemplary embodiments of the present invention has an advantageous effect in that an auto focusing module is used to vertically move a lens, an auto focusing module is tilted to perform handshake compensation, and an opening symmetrical to a main circuit board coupled to the auto focusing module is formed to prevent the auto focusing module from performing an erroneous tilting operation.

Another advantageous effect is that an opening (810) is formed at a center of the spring unit (820) to enable formation of a compact camera module with less size of length and breadth over the conventional camera module, while maintaining an entire area of the spring unit (820) elastically supporting the body unit (801).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the present invention has an industrial applicability in that it can be applied to a camera module mounted on miniaturized electronic devices such as mobile phones and tablet personal computers.

What is claimed is:

1. A camera module, the camera module comprising:
an auto focusing module including a first housing, a bobbin disposed at an inner side of the first housing, a first driving unit disposed at the bobbin, a second driving unit disposed at the first housing and facing the first driving unit;
a third driving unit facing the second driving unit;
a first circuit board including a body member supporting the auto focusing module and an spring member coupled with the body member; and
an image sensor mounted on an upper surface of the body member,
wherein the body member and the auto focusing module are tiltably supported by the spring member.

2. The camera module of claim 1, wherein the body member is formed as a Rigid Printed Circuit Board (RPCB), and the spring member is formed as a Flexible Printed Circuit Board (FPCB).

3. The camera module of claim 2, wherein the RPCB and the FPCB are integrally formed as a Rigid Flexible Printed Circuit Board (RFPCB).

4. The camera module of claim 1, wherein the first driving unit includes a first coil unit, the second driving unit includes a magnet unit, and the third driving unit includes a second coil unit.

5. The camera module of claim 4, wherein the magnet unit includes an auto focusing magnet facing the first coil unit and a handshake compensation magnet facing the second coil unit.

6. The camera module of claim 1, wherein the spring member includes a first spring unit coupled with the body member, a second spring unit spaced from the first spring unit, and a third spring unit connecting a portion of the first spring unit and a portion of the second spring unit, and
wherein the third spring unit includes a first portion disposed at one side of the body member and a second portion disposed at opposite side of the body member.

7. The camera module of claim 6, wherein a thickness of the first spring unit is smaller than that of the second spring unit.

8. The camera module of claim 6, wherein the first circuit board further includes an opening disposed between the first spring unit and the second spring unit, and
wherein the opening is extended along a periphery of the body member from the first portion to the second portion.

9. The camera module of claim 8, wherein the opening is formed along three successive surfaces of the body member in a slit shape.

10. The camera module of claim 1, further comprising:
a second housing disposed at an outer side of the first housing, and
wherein the third driving unit is disposed at the second housing.

11. The camera module of claim 10, further comprising:
a first elastic member coupled to the bobbin and the first housing, and
a second elastic member coupled to the first housing and the second housing.

12. The camera module of claim 1, further comprising:
a bottom case coupled to a bottom surface of the auto focusing module and the upper surface of the body member, and
a second circuit board disposed at the bottom case and electrically connected to the first driving unit and the third driving unit.

* * * * *